United States Patent [19]

Casarcia et al.

[11] Patent Number: 5,584,586
[45] Date of Patent: Dec. 17, 1996

[54] LASER SHOCK PEENED BEARINGS

[75] Inventors: Dominick A. Casarcia, Cincinnati; William D. Cowie, Xenia; Seetharamaiah Mannava, Cincinnati, all of Ohio

[73] Assignee: General Electric Company, Cincinnati, Ohio

[21] Appl. No.: 610,298

[22] Filed: Mar. 4, 1996

[51] Int. Cl.$^6$ .................................................. F16C 33/64
[52] U.S. Cl. ............................ 384/625; 384/492; 384/565
[58] Field of Search .................................. 384/490, 491, 384/492, 513, 565, 625

[56] References Cited

U.S. PATENT DOCUMENTS

| | | | |
|---|---|---|---|
| 3,850,698 | 11/1974 | Mallozzi et al. | 148/4 |
| 4,002,403 | 1/1977 | Mallozzi et al. | 350/160.8 |
| 4,060,769 | 11/1977 | Mallozzi et al. | 330/4.3 |
| 4,317,600 | 3/1982 | Li | 384/491 |
| 4,401,477 | 8/1983 | Clauer et al. | 148/4 |
| 4,479,682 | 10/1984 | Oliver | 384/475 |
| 4,659,241 | 4/1987 | Bamberger et al. | 384/625 |
| 4,696,581 | 9/1987 | Tsushima et al. | 384/625 X |
| 4,937,421 | 6/1990 | Ortiz, Jr. et al. | 219/121.68 |
| 5,067,825 | 11/1991 | Vance et al. | 384/99 |
| 5,127,019 | 6/1992 | Epstein et al. | 372/108 |
| 5,131,957 | 7/1992 | Epstein et al. | 148/565 |
| 5,147,140 | 9/1992 | Murakami et al. | 384/492 |
| 5,183,342 | 2/1993 | Daiber et al. | 384/475 |
| 5,201,585 | 4/1993 | Gans et al. | 384/99 |
| 5,306,360 | 4/1994 | Bharti et al. | 148/525 |
| 5,333,954 | 8/1994 | Noguchi et al. | 384/625 X |
| 5,409,415 | 4/1995 | Kawanami et al. | 451/39 |

OTHER PUBLICATIONS

"Laser shocking extends fatigue life", by John A. Vaccari, American Machinist, A Penton Publication, Jul. 1992, pp. 62–64.

"Effects Of Laser Induced Shock Waves On Metals", by Clauer, Holbrook and Fairans, Chapter 38, pp. 675–702. No Date.

"Laser Shock Processing Increases the Fatigue Life of Metal Parts", Materials and Processing Report, Sep. 1991, pp. 3–5.

*Primary Examiner*—Thomas R. Hannon
*Attorney, Agent, or Firm*—Andrew C. Hess; Nathan D. Herkamp

[57] ABSTRACT

A bearing element having a metallic body with a bearing contact curved surface portion, at least one laser shock peened surface encompassing at least a portion of the contact surface portion, and a region having deep compressive residual stresses imparted by laser shock peening (LSP) extending into the body from the laser shock peened surface. The present invention may be used for rolling elements such as ball bearing elements or elongated roller elements and for static elements such as races which may be singular or split and may have circumferentially spaced oil feed passages radially disposed therethrough.

12 Claims, 3 Drawing Sheets

LASER SHOCK PEENED BEARINGS

RELATED PATENT APPLICATIONS

The present Application deals with related subject matter in U.S. patent application Ser. Nos. 08/319,346, entitled "LASER SHOCK PEENED ROTOR COMPONENTS FOR TURBOMACHINERY" U.S. Pat. No. 5,492,447, U.S. Ser. No. 08/373,133, entitled "LASER SHOCK PEENED GAS TURBINE ENGINE FAN BLADE EDGES" U.S. Ser. No. 08/362,362, entitled "ON THE FLY LASER SHOCK PEENING".

BACKGROUND OF THE INVENTION

1. Field of the Invention

This invention relates to bearings and, more particularly, to bearings having localized compressive residual stresses imparted by laser shock peening along high stress areas of the bearings.

2. Description of Related Art

Conventional bearing assemblies includes inner and outer races between which are positioned a plurality of circumferentially spaced bearing or rolling elements such as ball or roller bearings, which are circumferentially spaced apart by an annular cage. Ball type bearings are commonly found in gas turbine engines where they are used as thrust bearings which typically have the outer race fixedly joined to a stationary housing, and the inner race fixedly mounted to a rotor shaft which is supported thereby. Roller bearings are elongated and are typically used to support concentric rotating shafts of the engine. Roller bearings may be of the cylindrical type or tapered conical type. The bearing elements and the races are subject to stresses.

For high rotational speed applications of the bearing assembly, for example, at DN values on the order of about $1.5 \times 10^6$, the inner race of the thrust ball bearings is axially split for providing a radially extending center plane disposed generally in line with the bearing centers, with a plurality of circumferentially spaced and radially extending oil center feed passages disposed at the split line. The center feed passages may be used to effectively carry lubricating oil radially outwardly to the bearings under centrifugal force upon rotation of the inner race and shaft. In a high speed split inner race bearing assembly, the inner races are subjected to relatively high stress induced by rotation. In particular, the central zone over which the ball tracks is most sensitive to any additional stress risers caused by material discontinuities such as holes or slots used to feed oil to the roller elements and the race surfaces upon which they bear and which can decrease the effective life of the bearing assembly. Conventional split inner race bearing assemblies, particularly, those used in gas turbine engines may also include secondary radial passages for lubricating adjacent components of the bearing assembly spaced axially from the split line.

U.S. Pat. No. 5,147,140, entitled "Ball-and Roller Bearing", by Murakami et al., provides for shot peened surfaces to impart compressive residual stresses on the order of a minimum of 100 kgf/mm² to a depth of up to 2% of the mean diameter of the rolling element. Recognizing the limitations of shot peening and the texturing it forms on the bearing or contact surfaces, the Murakami patent requires a closely sealed bearing using packing grease or some other technique to closely seal the bearing. This is not practical for many applications such as with main rotating shafts in gas turbine engines which require a constant supply of oil for cooling as well as lubrication purposes. It is therefore highly desirable to provide bearings with rolling and static elements having rolling contact surfaces with regions of deep compressive residual stresses beneath and a minimal amount of surface texturing so that sealed bearings are not required such as in the Murakami patent.

The region of deep compressive residual stresses imparted by laser shock peening of the present invention is not to be confused with a surface layer zone of a work piece that contains locally bounded compressive residual stresses that are induced by a hardening operation using a laser beam to locally heat and, thereby, harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on surface of transition area of forging dies using methods similar to those disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening as understood in the art and as used herein means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". However, the prior art does not disclose laser shock peening of curved contact surfaces of bearings nor the methods of how to produce them. It is to this end that the present invention is directed.

SUMMARY OF THE INVENTION

A bearing element having a metallic body with a bearing contact curved surface portion, at least one laser shock peened surface encompassing at least a portion of the contact surface portion, and a region having deep compressive residual stresses imparted by laser shock peening (LSP) extending into the body from the laser shock peened surface. Various embodiments of the present invention provide for the metallic body to be a rolling element such as a ball bearing element or an elongated roller element and a static element such as an annular race which may be singular or split and may have circumferentially spaced oil feed passages radially disposed therethrough.

Another embodiment of the invention provides a bearing assembly having annular inner and outer races and rolling elements disposed between the races. Each of the races and rolling elements has a contact curved surface portion, at least one laser shock peened surface encompassing at least a portion of the each contact surface portion, and a region having deep compressive residual stresses imparted by laser shock peening (LSP) extending into each of the races and rolling elements from each of the laser shock peened surfaces. The roller bearings may be of the cylindrical type or tapered conical type.

ADVANTAGES

Among the advantages provided by the present invention is the ability to provide long life bearing assemblies and their individual elements which can better withstand fatigue failure due to high cyclical peak level stressing. Extending the useful life of the bearings and elements the invention reduces maintenance costs of machinery using such bearings such as a gas turbine engine.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
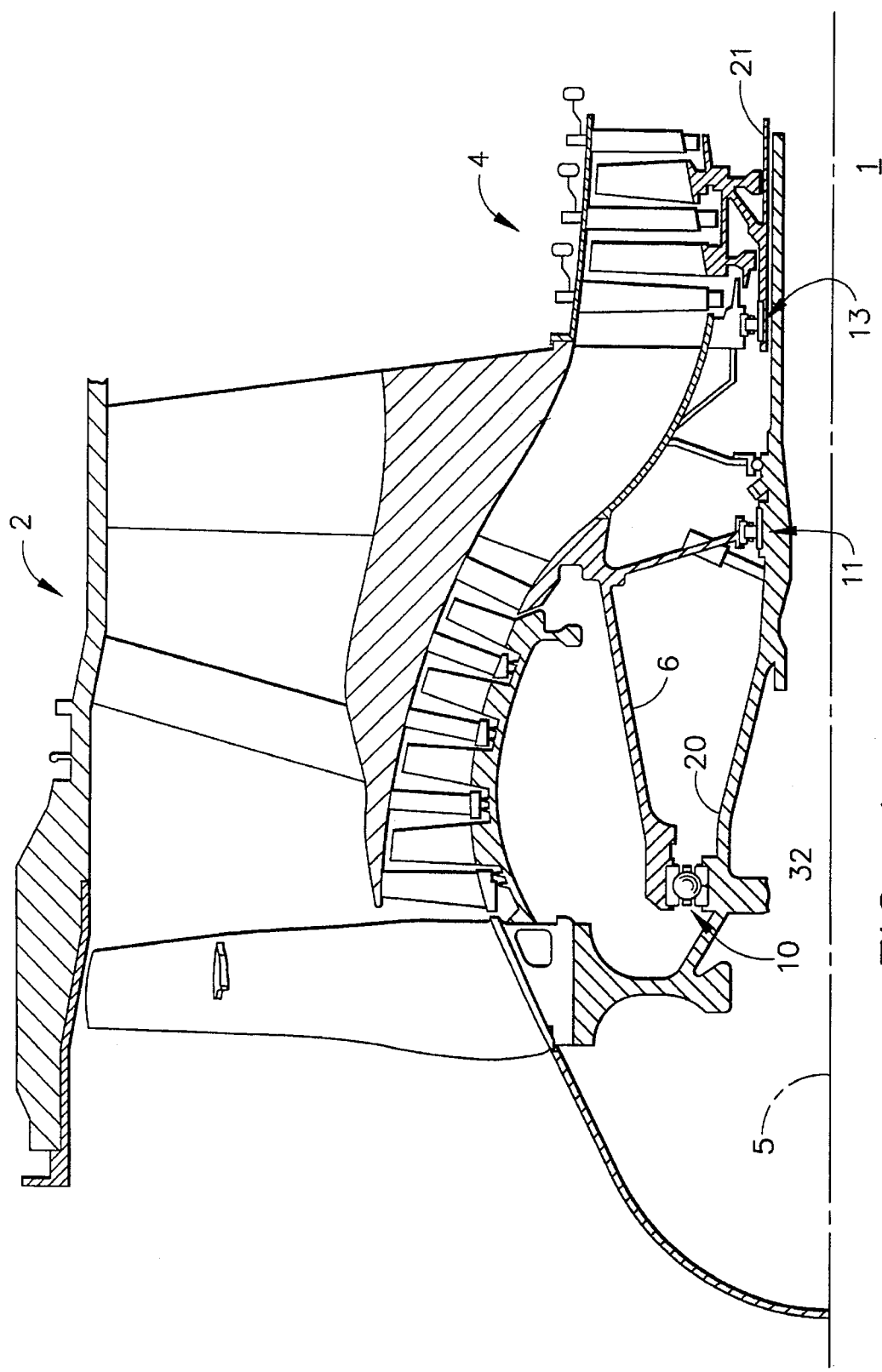
FIG. 1 is a cross-sectional illustrative view of an exemplary aircraft gas turbine engine having ball and roller bearing assemblies in accordance with the present invention.

Illustrated in FIG. 1 is a front portion of an exemplary aircraft gas turbine engine 1 including a fan section 2 and a portion of a compressor section 4 and a stationary annular housing 6 of the engine's frame, all of which are circumferentially disposed about an engine centerline 5. A No. 1 thrust ball bearing assembly 10 is disposed between the housing 6 of the engine's frame and a low pressure rotor shaft 20 of the engine. A No. 2 roller bearing assembly 11 is disposed between the housing 6 and low pressure rotor shaft 20 and a No. 3 roller bearing assemblies 13 is disposed between the housing 6 and a high pressure shaft 21, as is typically found in large aircraft gas turbine engines. The No. 1 through No. 3 designations are consistent with bearing designations used for a General Electric CF6-80 type of engine and similar to designations used by other manufacturers of large gas turbine engines.

Figure 2:
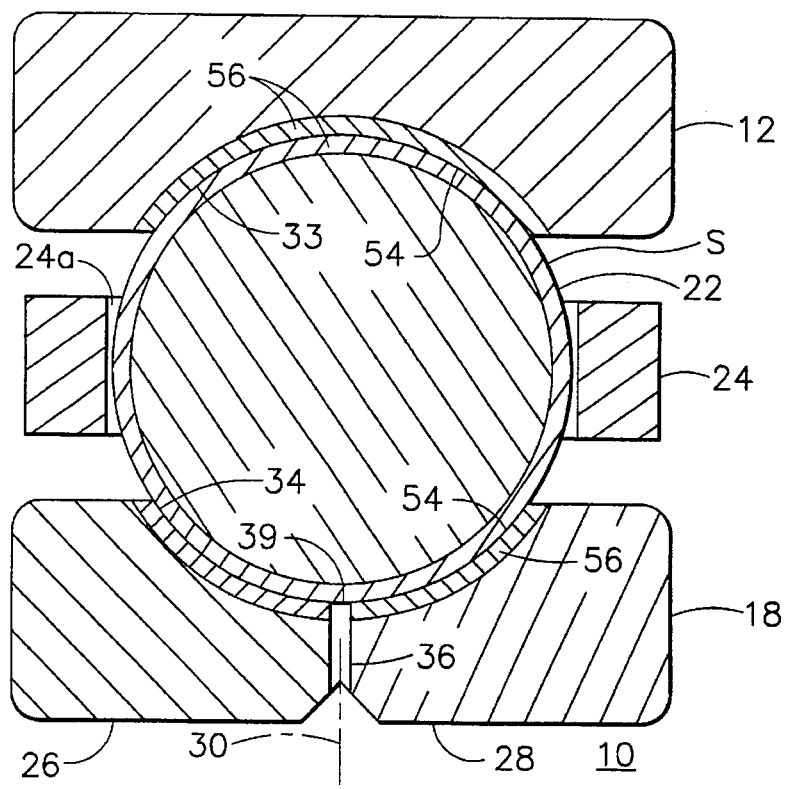
FIG. 2 is an enlarged illustrative view of the ball bearing assembly illustrated in FIG. 2 in accordance with the present invention.

Illustrated in FIG. 2 is the thrust ball bearing assembly 10 having an annular outer race 12 disposed coaxially about the longitudinal or axial engine centerline 5 which is fixedly mounted in the stationary annular housing 6. The thrust ball bearing assembly 10 further includes a rotatable, annular split inner race 18 fixedly mounted to the rotor shaft 20 which is rotatable at a speed N. A plurality of circumferentially spaced ball bearings 22 are disposed between the outer and inner races 12 and 18 and have a curved spherical surface S. An annular cage 24 having a plurality of circumferentially spaced, radial apertures 24a surrounds respective bearings 22 and loosely traps the ball bearings 22 for circumferentially separating the ball bearings. The split inner race 18 includes an annular forward inner race half 26 and an annular aft inner race half 28 which meet and are pressed together in abutting relationship at a radially extending, axial split surface or split line 30. The second inner race half 28 is clamped against the first inner race half 26 at the split line 30 typically by a nut threadingly mounted to the shaft 20 for securing the inner race 18 against a conventional shoulder formed in the shaft 20.

Ball bearings 22 are radially and axially trapped between curved semi-spherical outer and inner circumferential surfaces 33 and 34, respectively, of the outer and inner races 12 and 18, respectively. The inner circumferential surface 34 has a plurality of circumferentially spaced and radially extending oil feed passages 36 which are surface discontinuities on the inner circumferential surface disposed at the split line 30. The oil feed passages 36 may be straight or arcuate grooves extending radially outwardly or vertically from the engine centerline 5 and are formed in the radial split line surface of the second inner race half 28. Since the region including the split line 30 is subject to high stress at high rotational speeds N resulting for example in operation of the ball bearing assembly 10 at values in excess of about $1.5 \times 10^6 DN$ and typically up to about $2.3 \times 10^6 DN$, the grooved oil feed passages 36 become stress risers which typically reduce the life of the ball bearing assembly 10.

To counter fatigue failure of portions of the bearing elements from cracks that can develop in the bearing static elements or races, and in the rolling elements such as ball the bearings, and those which can emanate from discontinuities in the race's surfaces, the present invention provides a laser shock peened curved surface 54 on at least a portion of the contact surfaces of the bearing elements which include the semi-spherical outer and inner circumferential surfaces 33 and 34, respectively, and the curved spherical surfaces S of the ball bearings 22. Pre-stressed laser shock peened curved regions 56 having deep compressive residual stresses imparted by laser shock peening (LSP) extend into the bearing elements from the laser shock peened surfaces 54. Preferably, the entire curved spherical surface S of the ball bearings 22 are so laser shock peened as are the curved contact semi-spherical outer and inner circumferential surfaces 33 and 34 of the outer and inner races 12 and 18, respectively.

Figure 3:
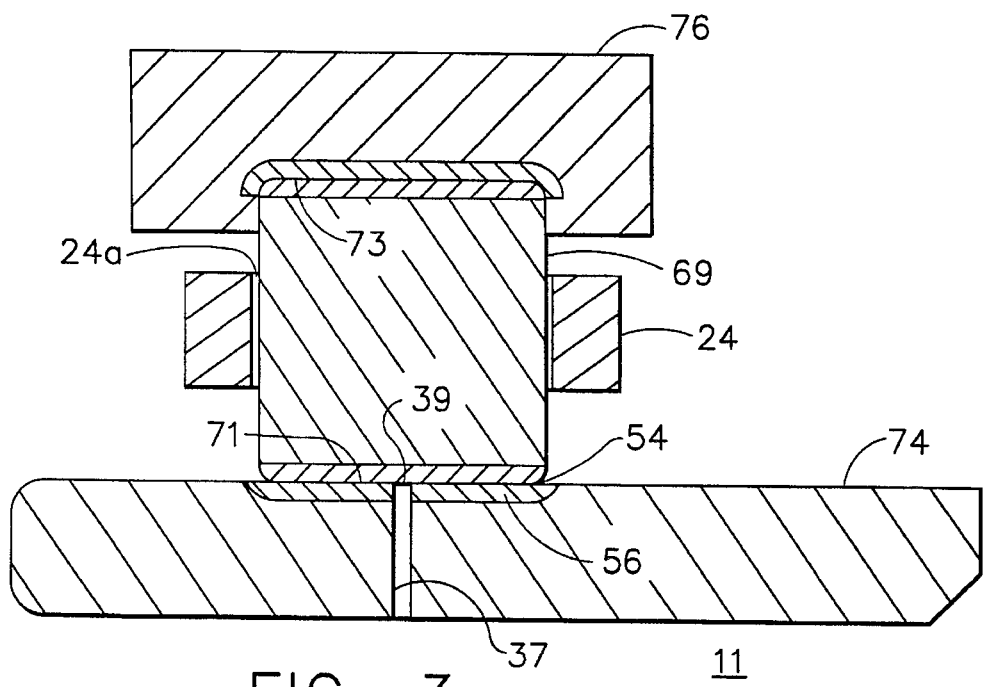
FIG. 3 is an enlarged illustrative view of the roller bearing assembly illustrated in FIG. 2 in accordance with the present invention.

Illustrated in FIG. 3 is the invention as applied to a roller bearing such exemplified by the roller bearing assembly 11 disposed between the housing 6 and the low pressure rotor shaft 20 and includes elongated roller elements 69 trapped between inner and outer annular and generally cylindrically curved surfaces 71 and 73 of inner and outer annular races 74 and 76, respectively. The inner annular race 74 has oil feed passages in the form of circumferentially spaced and radially extending oil feed holes 37 disposed therethrough. The oil feed holes 37 have a plurality of ports 39 which are surface discontinuities on the inner annular curved contact surface 71. The oil feed holes 37 are used to lubricate the bearings and also provide oil for damping. The present invention provides laser shock peened curved surfaces 54 along at least portions of the cylindrically curved surfaces 71 and 73. Pre-stressed laser shock peened curved regions 56 having deep compressive residual stresses imparted by laser shock peening (LSP) extending into the bearing elements from the laser shock peened surfaces 54 which preferably include radially facing contact portions of the rolling element 69 and the inner and outer annular cylindrically curved surfaces 71 and 73, respectively. The roller bearings 69 are illustrated as the cylindrical but may also be tapered or conical as illustrated in FIG. 4.

Figure 4:
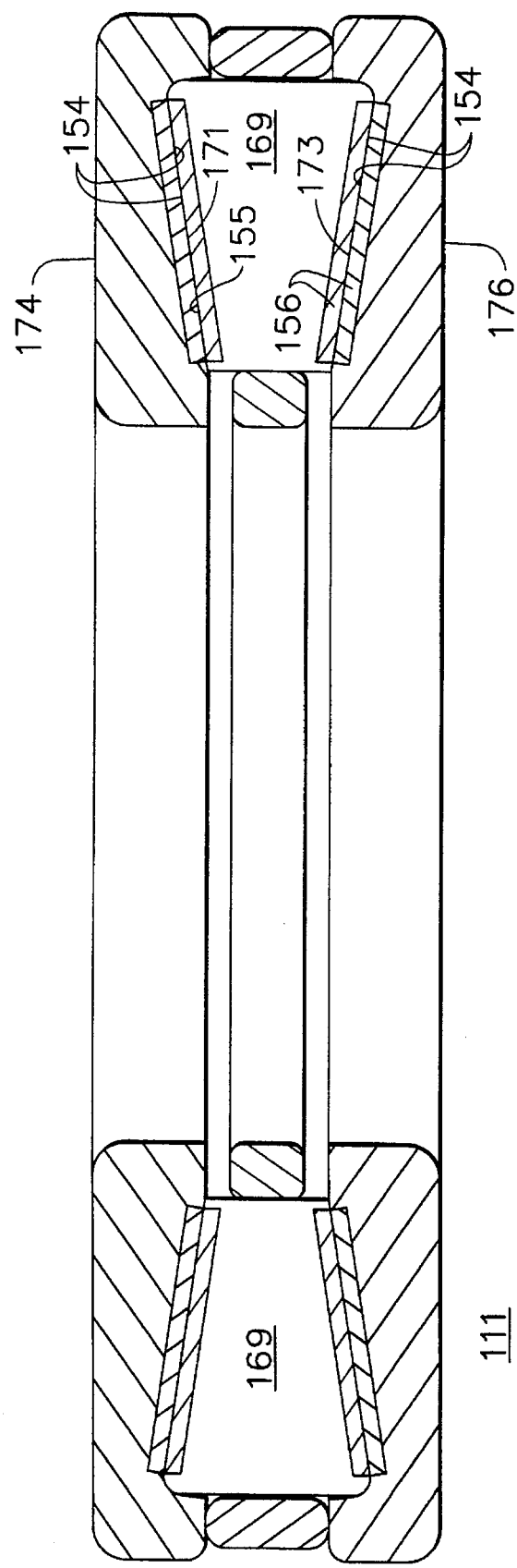
FIG. 4 is an illustrative view of the a tapered roller bearing assembly in accordance with the present invention.

A conical or tapered roller bearing assembly 111 in accordance with one embodiment of the present invention is illustrated in FIG. 4 as having tapered roller elements 169 trapped between upper and lower tapered flat contact surfaces 171 and 173 of upper and lower tapered races 174 and 176, respectively. Laser shock peened tapered surfaces 154 are disposed along at least a part of the upper and lower tapered flat contact surfaces 171 and 173 and a tapered curved contact surface 155 of the tapered rolling element 169. Pre-stressed laser shock peened tapered regions 156 having deep compressive residual stresses imparted by laser shock peening (LSP) extending into the bearing elements from the laser shock peened tapered surfaces 154 and the conical contact surface 155 of the tapered rolling element 169 and the upper and lower tapered flat contact surfaces 171 and 173, respectively.

The laser beam shock induced deep compressive residual stresses in the compressive pre-stressed regions 56 are generally about 50–150 KPSI (Kilo Pounds per Square Inch) extending from the laser shock surfaces 54 to a depth of about 20–50 mils into laser shock induced compressive residually pre-stressed regions 56. The laser beam shock induced deep compressive residual stresses are produced by repetitively firing a high energy laser beam that is focused on surface 54 which is covered with paint to create peak power densities having an order of magnitude of a gigawatt/cm$^2$. The laser beam is fired through a curtain of flowing water that is flowed over the surface 54 and the paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shock waves determine the depth and intensity of the compressive stresses. The paint is used to protect the target surface and also to generate plasma. Ablated paint material is washed out by the curtain of flowing water. This and other methods for laser shock peening are disclosed in greater detail in U.S. Pat. No. 5,492,447, entitled "LASER SHOCK PEENED ROTOR COMPONENTS FOR TURBOMACHINERY", and in U.S. patent application Ser. No. 08/362.362, entitled "LASER SHOCK PEENING ON THE FLY" which are both incorporated herein by reference.

While the preferred embodiment of the present invention has been described fully in order to explain its principles, it is understood that various modifications or alterations may be made to the preferred embodiment without departing from the scope of the invention as set forth in the appended claims.

We claim:

1. A bearing element comprising:

a metallic body having a bearing contact curved surface portion, at least one laser shock peened surface encompassing at least a portion of said contact surface portion, a region having deep compressive residual stresses imparted by laser shock peening (LSP) extending into said body from said laser shock peened surface.

2. A bearing element as claimed in claim 1 wherein said metallic body is a rolling element.

3. A bearing element as claimed in claim 2 wherein said rolling element is an elongated roller element.

4. A bearing element as claimed in claim 2 wherein said rolling element is a tapered roller bearing.

5. A bearing element as claimed in claim 2 wherein said rolling element is a ball bearing.

6. A bearing element as claimed in claim 1 wherein said metallic body is an annular race.

7. A bearing element as claimed in claim 6 wherein said race has circumferentially spaced oil feed passages radially disposed therethrough.

8. A bearing assembly comprising:

annular inner and outer races, rolling elements disposed between said races each of said races and rolling elements having a contact curved surface portion, at least one laser shock peened surface encompassing at least a portion of said each contact surface portion, a region having deep compressive residual stresses imparted by laser shock peening (LSP) extending into each of said races and rolling elements from said each laser shock peened surface.

9. A bearing assembly as claimed in claim 8 wherein said inner race is a split inner race.

10. A bearing assembly as claimed in claim 9 further including circumferentially spaced oil feed passages radially disposed through adjacent static annular elements of said inner race.

11. A bearing assembly as claimed in claim 8 wherein said rolling elements are ball bearings.

12. A bearing assembly comprising:

upper and lower tapered races, tapered rolling elements disposed between said races each of said races and rolling elements having a tapered contact surface portion, at least one laser shock peened surface encompassing at least a portion of said each contact surface portion, a region having deep compressive residual stresses imparted by laser shock peening (LSP) extending into each of said races and rolling elements from said each laser shock peened surface.

\* \* \* \* \*